US008548990B2

(12) United States Patent
Bennett et al.

(10) Patent No.: US 8,548,990 B2
(45) Date of Patent: Oct. 1, 2013

(54) PRESENTING INTERACTIVE IMAGES WITH SEARCH RESULTS

(75) Inventors: Eric Paul Bennett, Bellevue, WA (US); Rajeev Kumar Chand, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/341,350

(22) Filed: Dec. 30, 2011

(65) Prior Publication Data
US 2013/0173570 A1 Jul. 4, 2013

(51) Int. Cl.
*G06F 7/00* (2006.01)

(52) U.S. Cl.
USPC ........................................... 707/722

(58) Field of Classification Search
USPC ............... 707/706, 736, 758, 999.107, 722, 707/729; 715/838; 345/419
See application file for complete search history.

(56) References Cited

U.S. PATENT DOCUMENTS

| | | | |
|---|---|---|---|
| 6,157,933 A | 12/2000 | Celi et al. | |
| 6,546,397 B1 | 4/2003 | Rempell | |
| 7,003,734 B1 | 2/2006 | Gardner et al. | |
| 7,548,936 B2 * | 6/2009 | Liu et al. | 1/1 |
| 7,644,373 B2 * | 1/2010 | Jing et al. | 715/838 |
| 7,777,648 B2 | 8/2010 | Smith et al. | |
| 7,913,185 B1 | 3/2011 | Benson et al. | |
| 8,429,173 B1 * | 4/2013 | Rosenberg et al. | 707/748 |
| 2004/0222987 A1 * | 11/2004 | Chang et al. | 345/419 |
| 2007/0174790 A1 * | 7/2007 | Jing et al. | 715/838 |
| 2008/0222273 A1 | 9/2008 | Lakshmanan et al. | |
| 2008/0235187 A1 | 9/2008 | Gade et al. | |
| 2010/0080470 A1 | 4/2010 | Deluca et al. | |
| 2010/0082661 A1 | 4/2010 | Beaudreau | |
| 2011/0016376 A1 | 1/2011 | Hinson | |
| 2011/0018896 A1 | 1/2011 | Buzyn et al. | |

(Continued)

FOREIGN PATENT DOCUMENTS

KR 10-2008-0078333 A 8/2008

OTHER PUBLICATIONS

McCarth, Stuart, "Exploring User Interactions for an Online Photo-Sharing Application", Published on: Apr. 2008, Available at: http://www.cs.bath.ac.uk/~mdv/courses/CM30082/projects.bho/2007-8/McCarthy-SA-dissertation-2007-8.pdf.

(Continued)

*Primary Examiner* — Hung T Vy
(74) *Attorney, Agent, or Firm* — Shook, Hardy & Bacon L.L.P.

(57) ABSTRACT

Systems, methods, and computer-readable storage media for presenting interactive images associated with a search engine in association with a search engine results page (SERP) are provided. Upon receiving a search query at a search engine, it is determined that the search query content has a related interactive image associated with the search engine. An interactive image may be associated with the search engine, for instance, by having been previously presented as a background image for a search engine home page. A link to the interactive image may be presented as a search result on the SERP, the interactive image may be automatically presented as a background image of the SERP, or the interactive image may be determined to be related to an algorithmically-derived search result and a visual indicator thereof may be presented in association with the search result.

18 Claims, 8 Drawing Sheets

(56) References Cited

U.S. PATENT DOCUMENTS

2011/0047145 A1    2/2011    Ershov
2011/0113315 A1    5/2011    Datha et al.
2011/0314419 A1    12/2011    Dunn et al.

OTHER PUBLICATIONS

Allasia, et al., "Search on Audio-visual content Using Peer-to-peer Information Retrieval", Published on: Jul. 23, 2007, Available at: http://acsi-project.haifa.il.ibm.com/papers/deliverables/sapir_d1_1.pdf.

Kroepfi, et al., "Efficiently Locating Photographs in Many Panoramas", In Proceedings of the 18th SIGSPATIAL International Conference on Advances in Geographic Information Systems, Nov. 2-5, 2010, pp. 119-128.

Zhang, et al., "Annotating and Navigating Tourist Videos", In Proceedings of the 18th SIGSPATIAL International Conference on Advances in Geographic Information Systems, Nov. 2-5, 2010, pp. 260-269.

Ay, et al., "Viewable Scene Modeling for Geospatial Video Search", In Proceedings of the 16th ACM International Conference on Multimedia, Oct. 26-31, 2008, pp. 309-318.

"Beyond Ten Blue Links—Bing at SES London 2010", Retrieved on: Aug. 2, 2011, Available at: http://community.microsoftadvertising.com/blogs/advertiser/archive/2010/02/16/beyond-ten-blue-links-ses-london-2010.aspx.

PCT International Search Report and Written Opinion mailed Mar. 29, 2013 regarding PCT/US2012/069605 11 pages.

Lehtonen, et al., "Towards User-friendly Mobile Browsing", In Proceeding of the 2nd International Workshop on Advanced Architectures and Algorithms for Internet Delivery and Applications, ACM International Conference Proceedings Series, vol. 198, Article 6, 2006, p. 7.

Schwartz, Barry, "Google Home Page Automatically Changing Background Image on Jun. 10", published Jun. 10, 2010, http://searchengineland.com/google-home-page-automatically-changing-background-image-on-june-10th-43999, 9 pages.

Bose, Karthik, "Photosynth from Microsoft: Your Pictures in 3D", published Aug. 21, 2008, http://techpp.com/2008108/21/photosynth-from-microsoft-your-pictures-in-3d/, 7 pages.

Atismohanty, "Photosynth Technology", published Sep. 30, 2009, http://churmura.com/general/photosynth-technology/18846/, 9 pages.

\* cited by examiner

PRESENTING INTERACTIVE IMAGES WITH SEARCH RESULTS

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the BING search engine provided by Microsoft Corporation of Redmond, Wash. Initially upon a user expressing a desire to utilize a search utility, a home page associated with the particular search utility is presented that includes a search query input area into which the user may input keywords or phrases for which relevant search results are desired. Upon input of the keywords or phrases, a search engine results page (SERP) is presented that typically lists a plurality of search result descriptors, selection of any one of which navigates the user to a webpage associated with the described search result. This type of experience fails to offer the user an immersive experience and is limited in its ability to encourage attachment of the user with the search utility.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, presenting interactive images associated with a search engine in association with a search engine results page (SERP). Upon receiving a search query at a search engine, it is determined whether the search query content has a related interactive image associated with the search engine. An interactive image may be associated with the search engine, for instance, by having been previously presented as an immersive background image for the search engine home page. Upon determining that the search query content has a related interactive image associated with the search engine, a link to the interactive image may be presented as a search result on the SERP (for instance, in addition to algorithmically-derived search results) or the interactive image may be automatically presented as a background image of a webpage associated with the search engine, for instance, a SERP. In other embodiments, an interactive image may be determined to be related to an algorithmically-derived search result and a visual indicator thereof may be presented in association with the search result.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
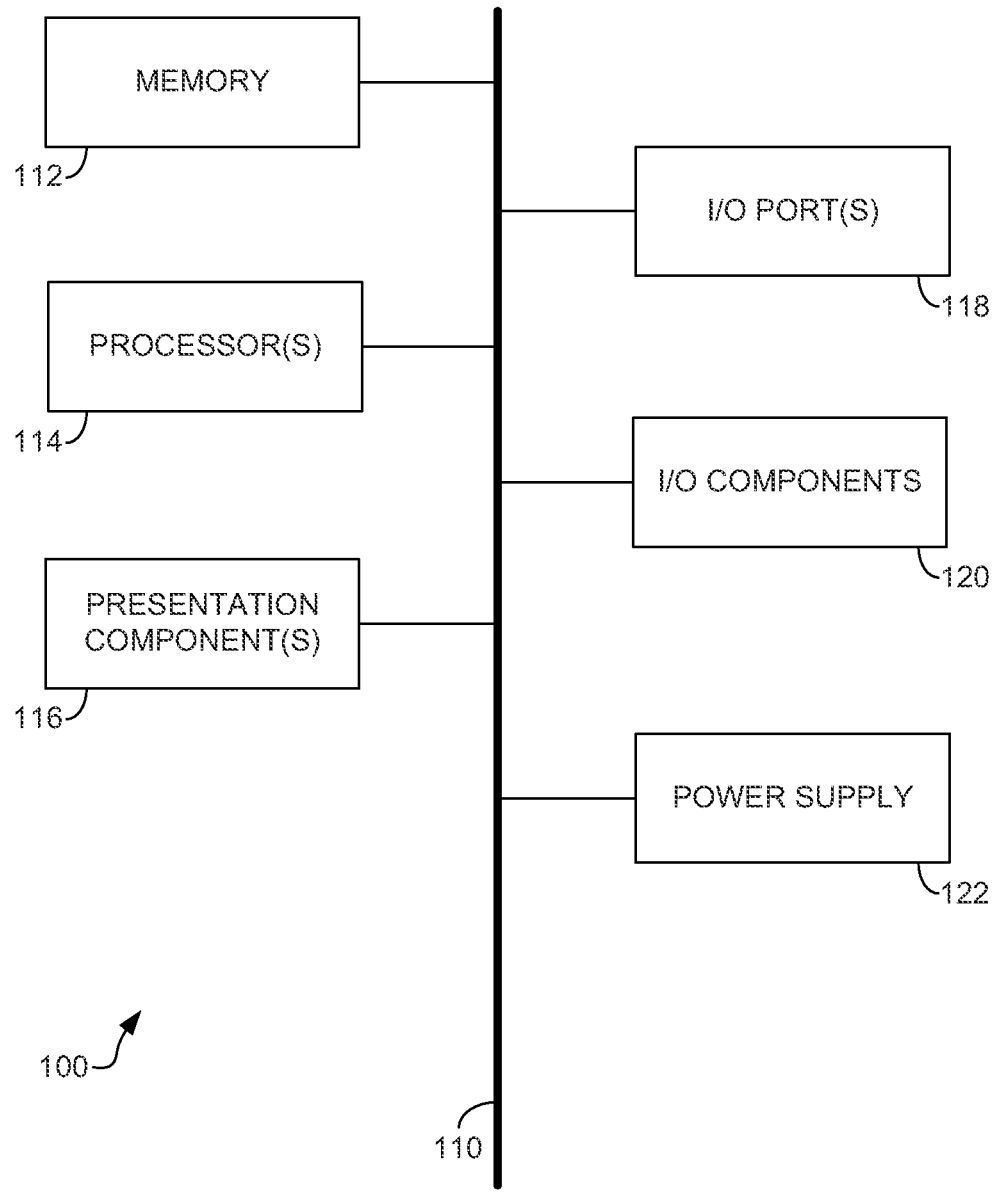
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, presenting interactive images associated with a search engine in association with a search engine results page (SERP). Upon receiving a search query at a search engine, it is determined whether the search query content has a related interactive image associated with the search engine. An interactive image may be associated with the search engine, for instance, by having previously been presented as a background image for the search engine home page. Upon determining that the search query content has a related interactive image associated with the search engine, a link to the interactive image may be presented as a search result or instant answer on the SERP (for instance, in addition to algorithmically-derived search results) or the interactive image may be automatically presented as a background image of a webpage associated with the search engine, e.g., the SERP. In other embodiments, an interactive image may be determined to be related to an algorithmically-derived search result and a visual indicator thereof may be presented in association with the search result.

Accordingly, one embodiment of the present invention is directed to one or more computer-readable storage media storing computer-useable instructions that, when used by one or more computing devices, cause the one or more computing devices to perform a method for presenting a link to an interactive image associated with a search engine as a search result. The method includes receiving a search query at the search engine, determining that content of the search query has a related interactive image associated with the search engine, and transmitting a link to the interactive image for presentation as a search result on a search engine results page.

Another embodiment of the present invention is directed to a system for automatically navigating a client device to a webpage associated with a search engine. The system comprises a computing device associated with a search engine having one or more processors and one or more computer-readable storage media and a data store coupled with the search engine. The search engine is configured to receive a search query from a client computing device, determine that content of the search query has a related interactive image associated with the search engine, and automatically navigate the client computing device to a webpage associated with the search engine, the webpage having the interactive image presented as a background image.

In yet another embodiment, the present invention is directed to a method for presenting a visual indicator in association with a search result to indicate that there is a related interactive image associated therewith. The method includes receiving a search query at a search engine; determining, by a processor, a plurality of search results that are directed to the received search query; determining, by the processor, that at least one of the plurality of search results has a related interactive image associated with the search engine; transmitting the plurality of search results for presentation; and transmitting a visual indicator for presentation in association with the at least one of the plurality of search results to indicate that there is a related interactive image associated therewith.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention relate to systems, methods, and computer-readable storage media for, among other things, presenting interactive images associated with a search engine in association with a search engine results page (SERP). Upon receiving a search query at a search engine, it is determined whether the search query content has a related interactive image associated with the search engine. An interactive image may be associated with the search engine, for instance, by having been previously presented as a background image for search engine home page. Upon determining that the search query content has a related interactive image associated with the search engine, a link to the interactive image may be presented as a search result on the SERP (for instance, in addition to algorithmically-derived search results) or the interactive image may be automatically presented as a background image of the SERP. In other embodiments, an interactive image may be determined to be related to an algorithmically-derived search result and a visual indicator thereof may be presented in association with the search result. Any of these embodiments, permits the user to be navigated into a rich, immersive experience with respect to an image that is determined to be related to the user's query and/or the results thereof.

Figure 2:
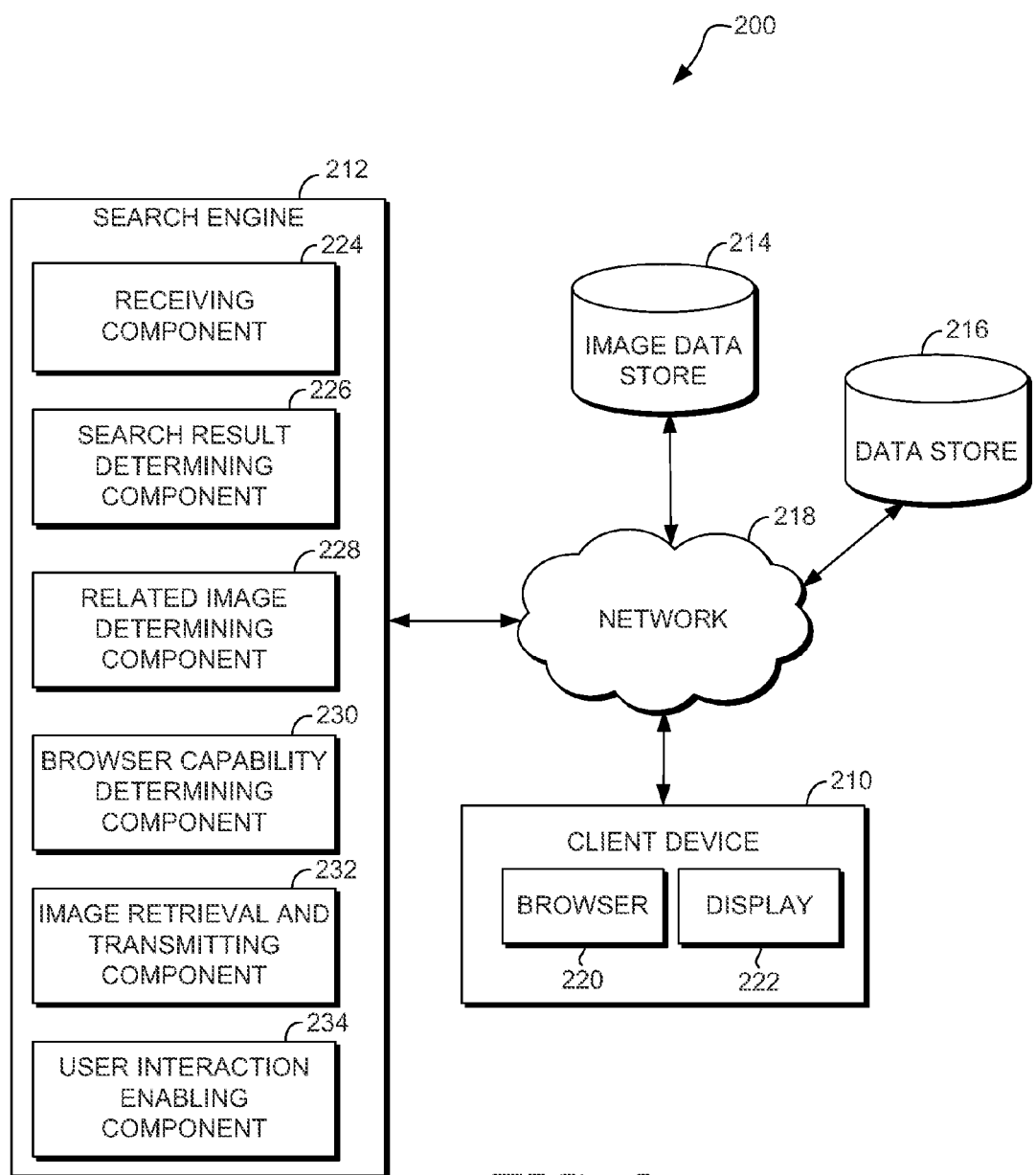
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which interactive images associated with a search engine are presented in association with a search engine home page and/or a SERP. As will be described in further detail below, embodiments of the present invention provide systems and methods for presenting interactive images by determining that an interactive image associated with a search engine is related to a search query and/or a search result and presenting a link to the interactive image as a search result or instant answer, automatically presenting the interactive image in association with a webpage associated with the search engine (e.g., the SERP), and/or presenting a visual indicator that a related interactive image exists in association with a particular search result descriptor.

Among other components not shown, the computing system 200 generally includes a client device 210, a search engine 212, an image data store 214, and another data store 216 all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of client devices, search engines and data stores may be employed in the computing system 200 within the scope of embodiments of the present invention. Each may comprise a single device/interface or multiple devices/interfaces cooperating in a distributed environment. For instance, the search engine 212 may comprise multiple devices and/or modules arranged in a distributed environment that collectively provide the functionality of the search engine 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the search engine 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the search engine 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 220 and a display 222. The browser 220 is configured to render a search engine home page, with or without a static image and/or an interactive image as at least a portion of the background, in association with the display 222 of the client computing device 210. The browser 220 is further configured to receive user input of requests for various web pages (including search engine home pages), receive user inputted search queries (generally inputted via a user interface presented on the display 222 and permitting alpha-numeric and/or textual input into a designated search box) and to receive content for presentation on the display 222, for instance, from the search engine 212. It should be noted that the functionality described herein as being performed by the browser 220 may be performed by any other application capable of rendering Web content. Any and all such variations, and any combination thereof, are contemplated to be within the scope of embodiments of the present invention.

The search engine 212 is configured to receive and respond to requests that it receives from components associated with client computing devices, for instance, the browser 220 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the search server 212 includes a receiving component 224, a search result determining component 226, a related image determining component 228, a browser capability determining component 230, an image retrieval and transmitting component 232, and a user interaction enabling component 234. The illustrated search engine 212 also has access to an image data store 214 and another data store 216. The image data store 214 is configured to store image data, that is, information associated with images. In various embodiments, such information may include, without limitation, raw image data, optimized image data, image data portions (e.g., image tiles, as more fully described below) and the like. Image data stored in association with the image data store 214 may take any of a number of different forms. For instance, such image data may be a single image or multiple images placed together such that the result appears to be a contiguous single image. Additionally, such image data may be in the form of a panorama or another explorable photo image (e.g., a synth). As utilized herein, the term "panorama" refers to a wide-angle view or representation of an image such that it appears to a person viewing the larger image that s/he is standing in one location and viewing toward different directions from a single vantage point. As utilized herein, the term "synth" refers to image data that is collectively assembled and presented such that it appears as though the viewer was looking at a the same object from a variety of different directions or vantage points. Regardless of the image data source, embodiments of the present invention break down the image data into image data portions or tiles such that the data may be processed in smaller chunks that contain less information. Such permits faster and more efficient image data processing. Accordingly, the image data store 214 is further configured to store image data portions or tiles.

The data store 216 is configured to store information pertaining to received search queries and results thereof. The data store 216 is further configured to store information about images stored in association with the image data store 214. In this regard, the data store 216 is configured to store entities associated with the images. An entity may include a title, a subject, a creator, a genre, or any other information, categorical or otherwise, associated with the images in the image data store 214. The entities are configured to serve as triggers for engaging the user in a rich, immersive explorable photo experience, as more fully described below.

In embodiments, the image data store 214 and/or the data store 216 are configured to be searchable for one or more of the items stored in association therewith. It will be understood and appreciated by those of ordinary skill in the art that the information stored in association with the image data store 214 and/or the data store 216 may be configurable and may include any information relevant to search queries and their respective results, and images configured for presentation, for instance, on a search engine home page or a search engine results page. The content and volume of such information are not intended to limit the scope of embodiments of the present invention in any way. Further, though illustrated as two, independent components, the image data store 214 and the data store 216 may, in fact, be a single storage device or a plurality of storage devices, for instance a database cluster, portions of which may reside in association with the search engine 212, the client computing device 210, another external computing device (not shown), and/or any combination thereof.

Figure 4:
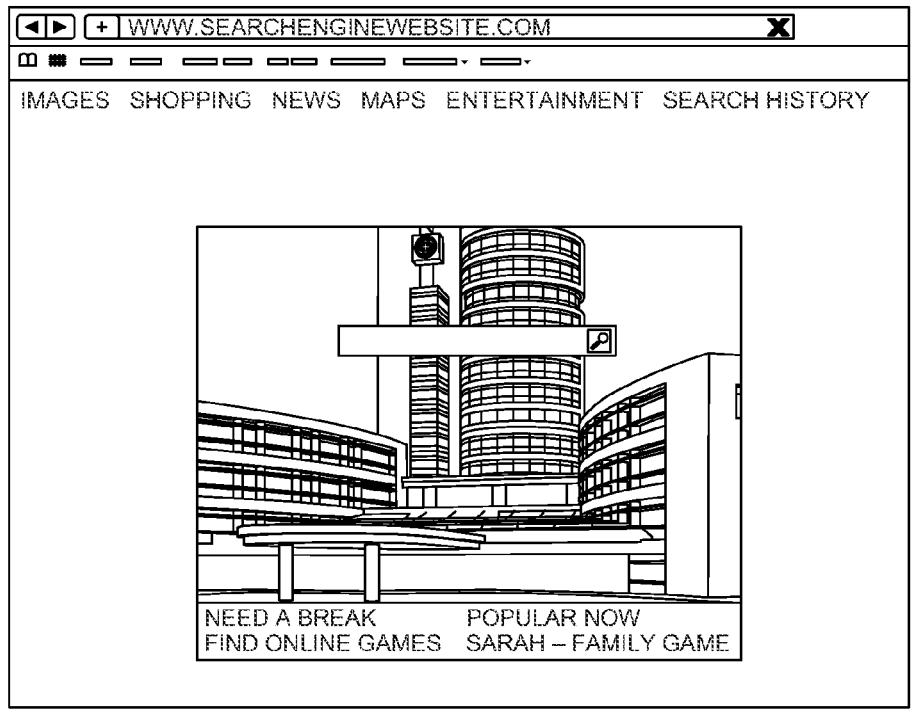
FIG. 4 is a schematic diagram showing an exemplary search engine home page, in accordance with an embodiment of the present invention.

The receiving component 224 of the search engine 212 is configured to receive search queries, usually input via a search engine home page, for instance, a search engine home page as shown in the screen display 400 of FIG. 4. Typically, such a search query is received via a browser associated with a client computing device, for instance, the browser 220 associated with the client computing device 210.

Upon receiving an input search query, the search result determining component 226 is configured to identify one or more search results that are determined to match the input query. In embodiments, search results are determined algorithmically and retrieved, at least in part, from the data store 216. Algorithms for determining search results matching an input search query are well known to those of ordinary skill in the art and, accordingly, are not further described herein.

The related image determining component 228 is configured to determine if there is an interactive image associated with the search engine that is related to the input search query and/or one or more of the search results determined to match the input search query. Interactive images associated with the search engine may be, for instance, immersive, interactive search engine home page images presented in accordance with commonly owned U.S. patent application Ser. No. 13/277,507 filed Oct. 20, 2011 and entitled "Enabling Immersive Search Engine Home Pages," which application is incorporated by reference as if set forth in its entirety herein.

In embodiments, upon the related image determining component 228 determining that an image exists that is associated with the search engine and that is related to the input search query and/or one or more of the search results determined to match the input search query, the browser capability determining component 230 is configured to determine whether a browser associated with a client computing device from which input of the search query was received (for instance, browser 220 associated with client device 210), is capable of receiving large, high-resolution, interactive images and of presenting the same. In embodiments, a preference determining component (not shown) may be present that is configured to determine whether any applicable user-preference settings permit or hinder such interactive image presentation.

Figure 5:
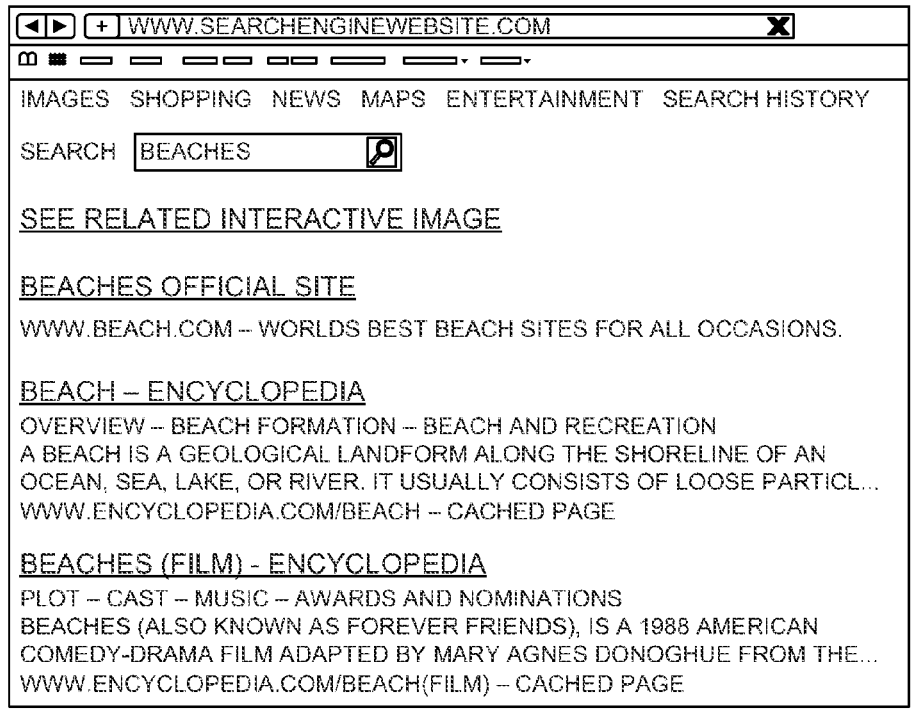
FIG. 5 is a schematic diagram showing an exemplary screen display of a search engine results page having a link to an interactive image as a search result, in accordance with an embodiment of the present invention.
Figure 6:
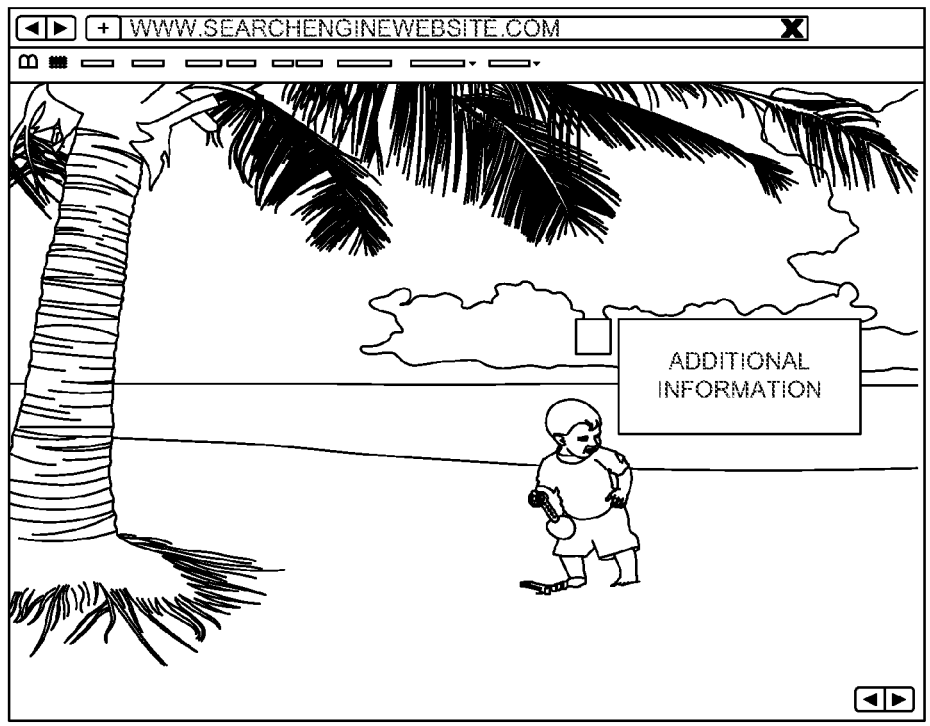
FIG. 6 is a schematic diagram showing an exemplary screen display upon user selection of the "SEE RELATED INTERACTIVE IMAGE" link from the search engine results page shown in FIG. 5, in accordance with an embodiment of the present invention.

In one embodiment (shown in the screen display 500 of FIG. 5), upon the related image determining component 228 determining that an image exists that is associated with the search engine and that is related to the input search query, and the browser capability determining component 230 determining that the browser from which the search query was received is capable of receiving and presenting an interactive image, a link 510 to the interactive image is presented on the search engine results page as a search result or instant answer. Subsequently, upon user selection of the link, the image retrieval and transmitting component 232 is configured to receive the high-resolution, large image data (e.g., from the image data store 214) and transmit such high-resolution data for presentation, e.g., as shown in the screen display 600 of FIG. 6.

Oftentimes, high-quality and/or high-resolution images are too large for efficient and timely transmission over the Internet. However, it is desirable that the images be able to load rapidly so as to provide user functionality as quickly as possible. As such, within the scope of embodiments hereof, it may be desirable to optimize the image data, for instance, via compression techniques and/or resolution-altering techniques. In embodiments, such functionality may be accomplished utilizing, e.g., CSS, JavaScript, and common image file formats that can run across a wide breadth of browsers. Additionally, in embodiments, it is desirable to provide the optimal user experience based on the bandwidth or connection speed associated with the requesting computing device. Any and all such variations, and any combination thereof, are contemplated to be within the scope of embodiments of the present invention.

In other embodiments (shown in the screen display 800 of FIG. 8, more fully described below), upon the related image determining component 228 determining that an image exists that is associated with the search engine and that is related to the input search query, and the browser capability determining component 230 determining that the browser from which the search query was received is capable of receiving and presenting an interactive image, the image retrieval and transmitting component 232 is configured to receive the high-resolution, large image data (e.g., from the image data store 214) and transmit such data for presentation as a background image of a webpage associated with the search engine, for instance, the search engine results page.

Figure 10:
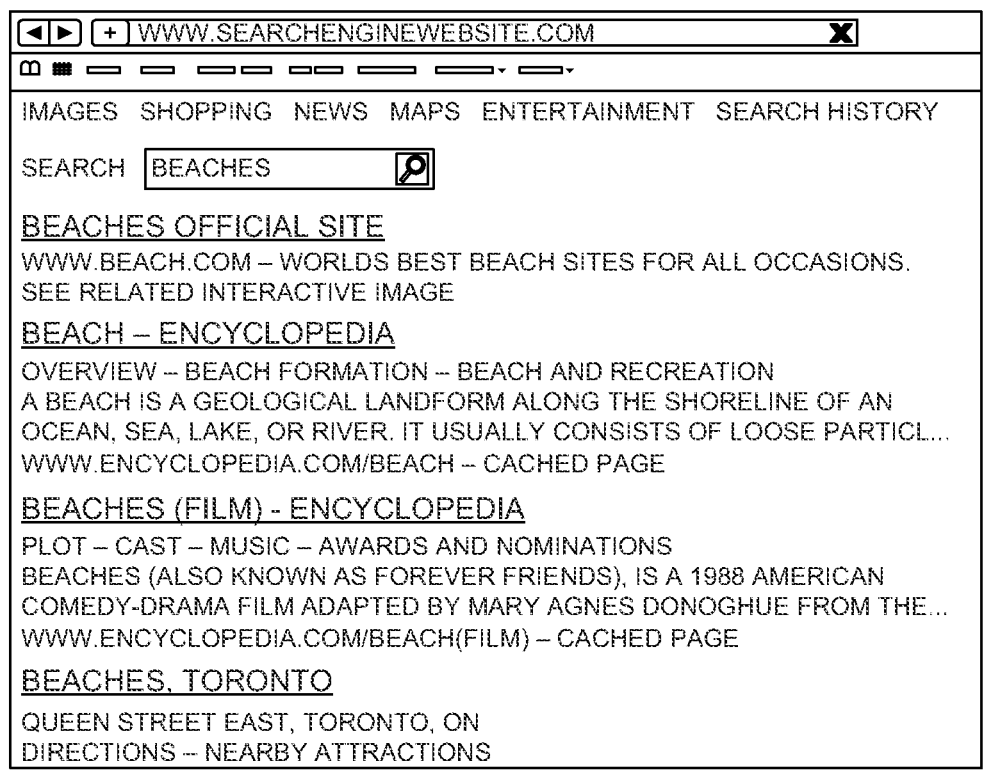
FIG. 10 is a schematic diagram showing an exemplary screen display of a search engine results page with one of the search results having a related visual indication that there is a related interactive image, in accordance with an embodiment of the present invention.

In yet another embodiment (shown in the screen display 1000 of FIG. 10), if the related image determining component 228 determines that an image exists that is associated with the search engine and that is related to one or more of the search results 1010 determined to match the input search query, and the browser capability determining component 230 determines that the browser from which the search query was received is capable of receiving and presenting an interactive image, a link 1012 to the interactive image is presented on the search engine results page as associated with the relevant search result 1010. Subsequently, upon user selection of the link, the image retrieval and transmitting component 232 is configured to receive the high-resolution, large image data (e.g., from the image data store 214) and transmit such data for presentation.

In still another embodiment (not shown), if the related image determining component 228 determines that an image exists that is associated with the search engine and that is related to the input search query, and the browser capability determining component 230 determines that the browser from which the search query was received is capable of receiving and presenting an interactive image, the image retrieval and transmitting component 232 is configured to receive the high-resolution, large image data (e.g., from the image data store 214) and transmit such data for presentation as a full page desktop experience. Such a desktop experience is described in commonly owned U.S. patent application Ser. No. 13/277,648 filed Oct. 20, 2011 and entitled "Enabling Immersive, Interactive Desktop Image Presentation," which application is incorporated by reference as if set forth in its entirety herein.

Any and all such variations, and any combination thereof, are contemplated to be within the scope of embodiments of the present invention.

Figure 8:
FIG. 8 is a schematic diagram showing an exemplary screen display of a search engine results page, in accordance with an embodiment of the present invention, having an interactive image as the background thereof.

It should be noted that if it is determined by the browser capability determining component 230 that the browser associated with the requesting client computing device is not capable of receiving large, high-resolution, interactive images and/or of presenting the same, the image retrieval and transmitting component 232 is configured to retrieve a static image generally configured for presentation on a portion of the available display that is less than the entire display and to transmit such image for presentation—either automatically as the background of the SERP (as shown in FIG. 8) or upon selection of a link thereto as discussed above with respect to FIGS. 5 and 10.

In embodiments, for instance, where an interactive image is related to the search engine as having been presented previously in association with the search engine home page, the image transmitted in accordance with embodiments of the present invention may not be identical to that previously presented. For instance, a certain amount of metadata (e.g., user-input details, geo-tags, and the like) may be presented that were not presented when the image was shown previously.

Further, in embodiments, the image may include one or more interactive regions. Thus, the user interaction enabling component 234 is configured to enable user interaction with the general image and/or one or more interactive regions thereof. Upon user interaction with a particular interactive region (e.g., region 610 of FIG. 6), additional information and/or images may be presented. The additional information and/or images generally relate in some way to the underlying image associated with the particular interactive region. The interactive regions are anchored to a pixel location within the larger image to highlight specific aspects of each interactive image. These interactive regions may provide details about the content within the interactive image, as well as send users to queries and search verticals available within the search engine. With the introduction of scrollable and interactive content, the interactive regions in the larger image are anchored to pixel coordinates in the larger image, meaning that panning and zooming within the image will move the visual location of those interactive regions as well. This allows an interactive region that is located over a penguin in an Antarctic panorama, for instance, to always hover over that penguin, regardless of how the user moves through the panorama. This also means that the interactive region may not appear onscreen at all if the currently-viewed portion of that panorama does not include the anchored pixels.

In addition to interactive regions activated upon user interaction therewith, embodiments of the present invention may provide interactive functionality without express user initiation. That is, automatic (i.e., without user initiation) slight image movement, for instance, panning back and forth, and/or highlighting of controls, may occur to alert or remind the user that additional functionality with respect to the image is available and to entice the user to engage in the interactive experience offered. Any and all such variations, and any combination thereof, are contemplated to be within the scope of embodiments of the present invention.

Figure 3:
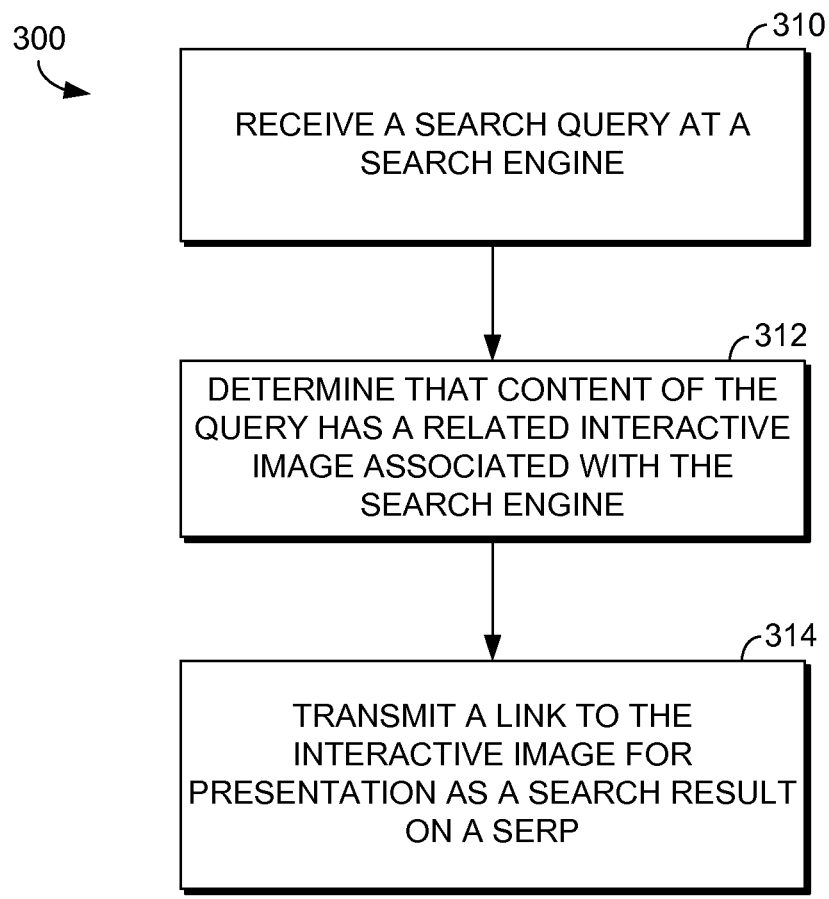
FIG. 3 is a flow diagram showing an exemplary method for presenting a link to an interactive image as a search result, in accordance with an embodiment of the present invention.

With reference now to FIG. 3, a flow diagram is illustrated showing an exemplary method 300 for presenting a link to an interactive image as a search result, in accordance with an embodiment of the present invention. As shown at block 310, a search query is received at the search engine, for instance, by receiving component 224 of the search engine 212 of FIG. 2. Upon receipt of the query, it is determined that content of the search query has a related interactive image associated with the search engine, as indicated at block 312. In embodiments, determining that content of the search query has a related interactive image includes determining that content of the search query is related to at least one of an entity associated with the interactive image (e.g., a title, a subject, a creator, a genre, or any other information, categorical or otherwise, associated with the image) and information associated with an interactive region of the interactive image. A link to the interactive image is then presented, as indicated at block 314, as a search result on the SERP. A SERP having a link 510 to an interactive image presented as a search result is shown in the screen display 500 of FIG. 5.

Figure 7:
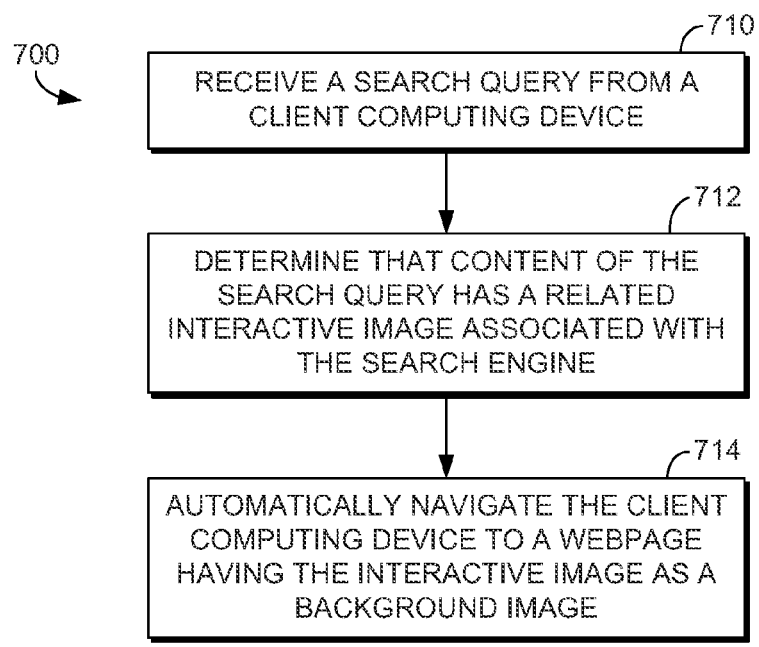
FIG. 7 is a flow diagram showing an exemplary method for automatically presenting an interactive image determined to be related with an input search query as the background image of a search engine results page, in accordance with an embodiment of the present invention.

Turning to FIG. 7, a flow diagram is illustrated showing an exemplary method 700 for automatically presenting an interactive image determined to be related to an input search query as the background image of a search engine results page, in accordance with an embodiment of the present invention. As shown at block 710, a search query is received from a client computing device, e.g., client computing device 210 of FIG. 2. Upon receipt of the query, it is determined that content of the search query has a related interactive image associated with the search engine, as indicated at block 712. In embodiments, determining that content of the search query has a related interactive image includes determining that content of the search query is related to at least one of an entity associated with the interactive image (e.g., a title, a subject, a creator, a genre, or any other information, categorical or otherwise, associated with the image) and information associated with an interactive region of the interactive image. As indicated at block 714, the client computing device is automatically navigated to a webpage associated with the search engine, for instance, a SERP, and the interactive image is presented as a background image of the webpage (e.g., a SERP). A SERP having an interactive image presented as a background image is shown in the screen display 800 of FIG. 8.

Figure 9:
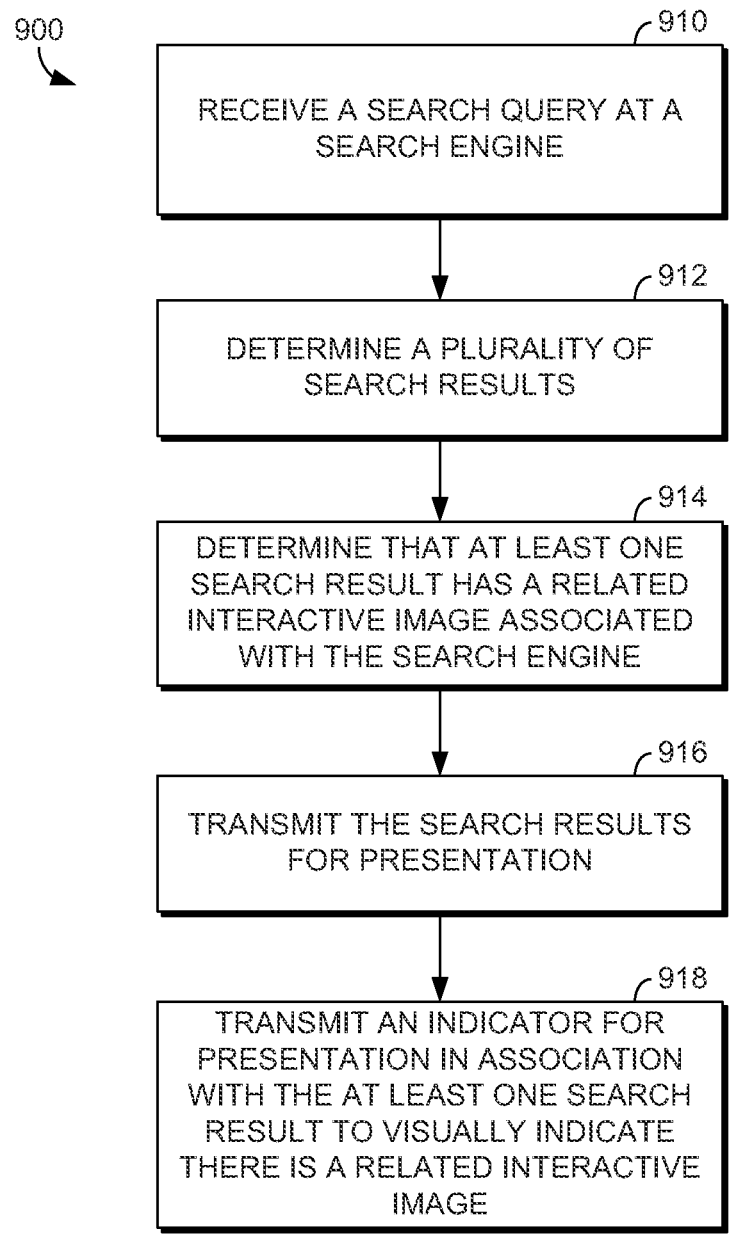
FIG. 9 is a flow diagram showing an exemplary method for presenting an indicator in association with a search result to visually indicate there is a related interactive image, in accordance with an embodiment of the present invention.

With reference now to FIG. 9, a flow diagram is illustrated showing an exemplary method 900 for presenting an indicator in association with a search result to visually indicate there is a related interactive image, in accordance with an embodiment of the present invention. As indicated at block 910, a search query is received at a search engine (e.g., by the receiving component 224 of the search engine 212 of FIG. 2 via the computing device 210). A plurality of search results is then determined (e.g., utilizing the search result determining component 226 of FIG. 2). It is then determined (e.g., utilizing the related image determining component 228 of FIG. 2) that at least one search result has a related interactive image associated with the search engine. In embodiments, determining that content of at least one search result has a related interactive image includes determining that content of at least one search result is related to at least one of an entity associated with the interactive image (e.g., a title, a subject, a creator, a genre, or any other information, categorical or otherwise, associated with the image) and information associated with an interactive region of the interactive image. Search results are transmitted for presentation, as indicated at block 916, and a visual indicator is transmitted for presentation in association with the relevant search result. This is indicated at block 918. A SERP having a link 1012 to an interactive mage presented in relation to a particular search result 1010 is shown in the screen display 1000 of FIG. 10.

As can be understood, embodiments of the present invention provide systems and methods for presenting interactive images associated with a search engine in association with a search engine results page. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3, the method 700 of FIG. 7 and the method 900 of FIG. 9 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer media devices storing computer-useable instructions that, when executed, cause a computing device to perform a method, comprising:
   receiving a search query at a search engine;
   determining that content of the search query has a related interactive image associated with the search engine;
   transmitting a link to the interactive image for presentation as a search result on a search engine results page;
   receiving a user selection of the link;
   transmitting the interactive image for presentation; and
   enabling user interaction with the interactive image by enabling movement of a location of at least one interactive region within the interactive image.

2. The one or more computer media devices of claim 1, wherein the method further comprises:
   determining at least one algorithmically-derived search result that matches the search query,
   wherein transmitting the link to the interactive image for presentation as a search result comprises transmitting the link to the interactive image for presentation as an additional search result with respect to the at least one algorithmically-derived search result.

3. The one or more computer media devices of claim 1, wherein transmitting the interactive image for presentation comprises transmitting the interactive image for presentation in association with the search engine results page.

4. The one or more computer media devices of claim 1, wherein determining that content of the search query has the related interactive image comprises determining that content of the search query is related to at least one of an entity associated with the interactive image and information associated with an interactive region of the interactive image.

5. The one or more computer media devices of claim 1, wherein the method further comprises enabling user interaction with the interactive image by enabling one or more of panning around the interactive image or zooming in to the interactive image.

6. The one or more computer media devices of claim 1, wherein the interactive image includes at least one interactive region that is anchored to a pixel location within the interactive image.

7. The one or more computer media devices of claim 1, wherein the interactive image comprises one of a panoramic image and another explorable photo image.

8. A system comprising:
   a computing device associated with a search engine having one or more processors and one or more computer-readable storage media; and
   a data store coupled with the search engine,
   wherein the search engine:
      receives a search query from a client computing device;
      determines that content of the search query has a related interactive image associated with the search engine; and
      automatically navigates the client computing device to a search engine results page associated with the search engine, the search engine results page having the interactive image presented as a background image to one or more search results.

9. The system of claim 8, wherein the search engine determines that content of the search query has the related interactive image by determining that content of the search query is related to at least one of an entity associated with the interactive image and information associated with an interactive region of the interactive image.

10. The system of claim 8, wherein the search engine further enables user interaction with the interactive image.

11. The system of claim 10, wherein the search engine enables user interaction with the interactive image by enabling one or more of panning around the interactive image or zooming in to the interactive image.

12. The system of claim 8, wherein the interactive image includes at least one interactive region that is anchored to a pixel location within the interactive image.

13. The system of claim 8, wherein the interactive image comprises one of a panoramic image and another explorable photo image.

14. A method comprising:
   receiving a search query at a search engine;
   determining, by a processor, a plurality of search results that are directed to the received search query;
   determining, by the processor, that at least one of the plurality of search results has a related interactive image associated with a previously presented home page of the search engine;
   transmitting the plurality of search results for presentation; and transmitting a visual indicator for presentation in association with the at least one of the plurality of search results to indicate that there is a related interactive image associated therewith.

15. The method of claim 14, further comprising:
receiving a selection of at least one of the at least one of the plurality of search results and the visual indicator associated therewith; and
transmitting the interactive image for presentation.

16. The method of claim 15, wherein the method further comprises enabling user interaction with the interactive image by enabling one or more of panning around the interactive image or zooming in to the interactive image.

17. The method of claim 15, wherein the interactive image includes at least one interactive region that is anchored to a pixel location within the interactive image.

18. The method of claim 14, wherein determining that at least one of the plurality of search results has the related interactive image comprises determining that the at least one of the search results is related to at least one of an entity associated with the interactive image and information associated with an interactive region of the interactive image.

* * * * *